US012648521B2

(12) United States Patent     (10) Patent No.:   US 12,648,521 B2

Beyrle et al.     (45) Date of Patent:     Jun. 9, 2026

---

(54) ROTARY RAKE

(71) Applicant: CLAAS Saulgau GmbH, Bad Saulgau (DE)

(72) Inventors: Michael Beyrle, Ettingen (DE); Roland Schelkle, Bad Saulgau (DE); Raphael Schupp, Neukirch (DE)

(73) Assignee: CLAAS Saulgau GmbH, Bad Saulgau (DE)

( * ) Notice: Subject to any disclaimer, the term of this patent is extended or adjusted under 35 U.S.C. 154(b) by 814 days.

(21) Appl. No.: 17/870,658

(22) Filed: Jul. 21, 2022

(65) Prior Publication Data

US 2023/0029318 A1    Jan. 26, 2023

(30) Foreign Application Priority Data

Jul. 23, 2021    (DE)  .........................  102021119091.6

(51) Int. Cl.
   *A01D 78/10*      (2006.01)
   *A01D 78/14*      (2006.01)
   *A01D 80/00*      (2006.01)

(52) U.S. Cl.
   CPC ......... *A01D 78/1078* (2013.01); *A01D 78/10* (2013.01); *A01D 78/14* (2013.01); *A01D 80/00* (2013.01)

(58) Field of Classification Search
   CPC ........ A01D 78/00–78/20; A01D 80/00–80/02; A01D 84/00–84/02; A01D 57/30; A01D 78/1078; A01D 78/10; A01D 78/1014; A01D 78/1085
   See application file for complete search history.

(56) References Cited

U.S. PATENT DOCUMENTS 2,926,476 A * 3/1960 Van Der Lely ...... A01D 78/148
                               56/370
2,995,885 A * 8/1961 Van Der Lely ........ A01D 78/14
                               56/370

(Continued)

FOREIGN PATENT DOCUMENTS

DE      1238258 B  *   4/1967
DE      19512514 A1 * 11/1995  ........... A01D 78/005

(Continued)

OTHER PUBLICATIONS

European Search Report, Dec. 13, 2022, 3 pages.

*Primary Examiner* — Joseph M Rocca
*Assistant Examiner* — Madeline I Runco

(57) ABSTRACT

Rotary rake (20) having a base frame (21) comprising a longitudinal bar (22) and extension arms (23) arranged on both sides of the longitudinal bar (22), wherein the rotary rake (20) is able to be coupled to a towing vehicle via a drawbar (25) attached to the longitudinal bar (22), having rake rotors (26) that are driven in rotation about a respective rotor axis, have tine arms (27) with rake tines (28), and are mounted on the extension arms (23), and having a swath turner (29) that is attached to the longitudinal bar (22) between the drawbar (25) and the extension arms (23) and has rake wheels (30, 31), wherein the swath turner (29) has, on each of the two sides of the longitudinal bar (12), a first rake wheel (30) with a first diameter and a second rake wheel (31) with a second diameter that is larger than the first diameter.

7 Claims, 5 Drawing Sheets

(56)    References Cited

U.S. PATENT DOCUMENTS

| | | | | |
|---|---|---|---|---|
| 3,117,407 | A | * | 1/1964 | Van Der Lely ........ A01D 78/14 |
| | | | | 56/377 |
| D298,139 | S | * | 10/1988 | van Staveren ................. D15/27 |
| 6,945,024 | B2 | | 9/2005 | Tonutti |
| 7,540,139 | B2 | * | 6/2009 | Rowse ................. A01D 78/146 |
| | | | | 56/377 |
| 8,322,124 | B2 | * | 12/2012 | Munk ................... A01D 78/144 |
| | | | | 56/367 |
| 2008/0256916 | A1 | * | 10/2008 | Vaske .................... A01D 78/16 |
| | | | | 56/13.5 |
| 2021/0161072 | A1 | * | 6/2021 | Speich ................... A01D 78/02 |

FOREIGN PATENT DOCUMENTS

| | | | | | |
|---|---|---|---|---|---|
| DE | 20109124 | U1 | * | 9/2001 | ............ A01D 78/10 |
| DE | 202006019212 | U1 | * | 6/2008 | ............ A01D 84/00 |
| EP | 0290059 | B1 | | 5/1992 | |
| EP | 0978228 | A1 | * | 2/2000 | |
| EP | 2281435 | A2 | * | 2/2011 | ............ A01D 78/06 |
| FR | 2553253 | A1 | * | 4/1985 | ............ A01D 57/30 |
| FR | 2663189 | A1 | | 12/1991 | |
| GB | 906179 | A | * | 9/1962 | |
| WO | WO-2012153243 | A1 | * | 11/2012 | ......... A01D 78/1007 |

* cited by examiner

ROTARY RAKE

The invention relates to a rotary rake according to the preamble of claim 1.

Haymaking machines are well known from practice. Thus, haymaking machines in the form of hay rakes and those in the form of tedders are known. The haymaking machine according to the invention is a rotary rake, which rakes together harvested material that has already been mown down, for example grass or the like, to form a swath.

FR 2 663 189 A1 discloses a rotary rake. The rotary rake has a base frame with a longitudinal bar and with extension arms that are arranged on the longitudinal bar. Attached to the longitudinal bar of the base frame is a drawbar, via which the rotary rake is able to be coupled to a towing vehicle. Attached to the respective extension arm on both sides of the longitudinal bar is a rake rotor, which has tine arms and rake tines. Also attached to the longitudinal bar, between the drawbar and the extension arms, or between the drawbar and the rake rotors, is a swath turner, wherein the swath turner has a rake wheel on each of the two sides of the longitudinal bar.

Proceeding therefrom, the present invention is based on the object of creating a novel rotary rake.

This object is achieved by a rotary rake according to claim 1.

According to the invention, the swath turner has, on each of the two sides of the longitudinal bar, a first rake wheel with a first diameter and a second rake wheel with a second diameter that is larger than the first diameter. Accordingly, in the case of the rotary rake according to the invention, the first rake wheel with the first diameter and the second rake wheel with the second diameter are present on each of the two sides of the longitudinal bar, wherein the second diameter is larger than the first diameter. As a result, with a minimum space requirement of the swath turner, the turning performance thereof can be enhanced.

Preferably, as seen in the longitudinal direction of the longitudinal bar, the respective second rake wheel is arranged at least partially between the respective first rake wheel and the extension arms. This is particularly preferred, in order, with a minimum space requirement of the swath turner, to enhance the turning performance thereof.

Preferably, as seen in the longitudinal direction of the longitudinal bar, the respective first rake wheel is arranged beneath the longitudinal bar. As a result, the space requirement of the swath turner can be reduced further.

Preferably, rake wheels arranged on the same side of the longitudinal bar are oriented parallel to one another with a partial overlap. Rake wheels arranged on different sides of the longitudinal bar are oriented so as to diverge in the direction of the extension arms. As a result, with a minimum space requirement, efficient swath turning can be ensured.

According to a further embodiment, the rake wheels can additionally also enclose an angle with the vertical—i.e. be inclined. The inclined rake wheels are oriented so as to converge in the direction of an underlying surface. As a result of the inclination of the rake wheels with respect to the vertical direction, the space requirement can be reduced.

Preferably, a rotary axle for the respective second rake wheel is attached to the longitudinal bar or to the drawbar via a link; in particular, the rotary axle for the respective second rake wheel is articulated in a pulled and spring-balanced manner via the respective link. A rotary axle for the respective first rake wheel is attached to the rotary axle for the respective second rake wheel via a further link, wherein the rotary axle for the respective first rake wheel is articulated in a pushed and spring-balanced manner via the respective link. This allows advantageous, independent ground following of the rake wheels.

Preferred developments of the invention will become apparent from the dependent claims and the following description. Exemplary embodiments of the invention are explained in more detail with reference to the drawing, without being limited thereto. In the drawing:

Figures 1, 2:
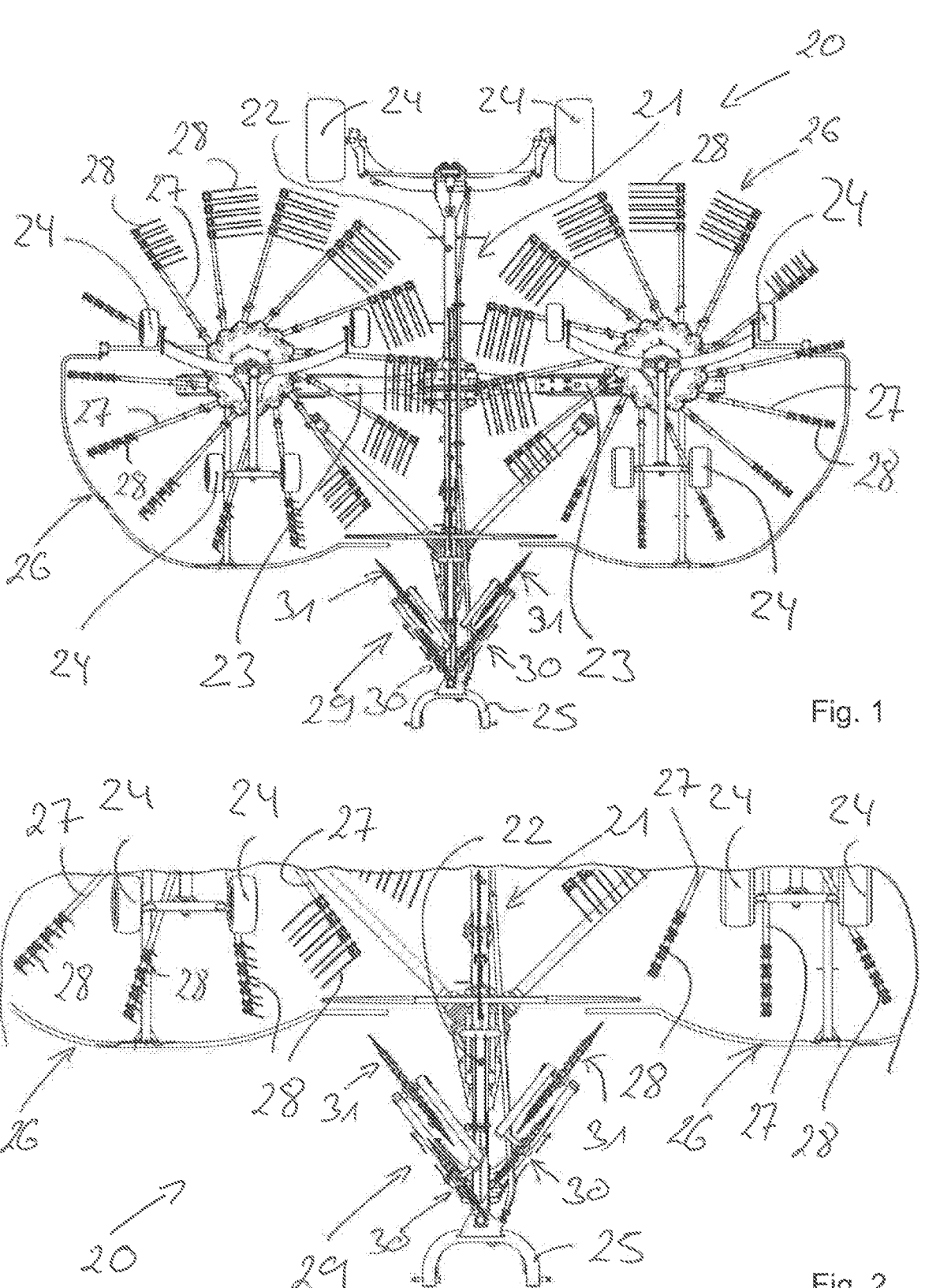
FIG. 1 shows a rotary rake according to the invention in a view from below.
FIG. 2 shows a detail of FIG. 1.

FIG. 1 shows a view from below of a rotary rake 20 according to the invention. The rotary rake 20 has a base frame 21, which has a longitudinal bar 22 and extension arms 23 positioned on both sides of the longitudinal bar 22 and attached to the longitudinal bar 22.

Via supporting wheels 24, the rotary rake 20 is supported on an underlying surface to be worked. Via a drawbar 25 attached to the longitudinal bar 22, the rotary rake 20 is able to be coupled to a towing vehicle.

The rotary rake 20 also has a rake rotor 26. Attached to each of the extension arms 23 is a respective rake rotor 26. In the exemplary embodiment shown, a rake rotor 26 is arranged on each of the two sides of the longitudinal bar 22, said rake rotor 26 being mounted on a corresponding extension arm 23. Each rake rotor 26 has a plurality of tine arms 27 with rake tines 28 attached to the tine arms 27. The rotary rake 20 shown is a central delivery hay rake.

Since the rake tines 27 are lifted off the ground toward the center or toward the longitudinal bar 22, they cannot grasp the harvested material lying there. This harvested material thus remains lying unmoved on the ground and the harvested material raked from the outer sides to the middle is laid thereon. In a subsequent harvesting process in which the harvested material is intended to be picked up off the ground, the unmoved harvested material usually cannot be readily grasped by the pick-up devices, for example pick-up units, and remains are left on the surface of the field. The ability of the unmoved harvested material to be picked up becomes even worse when it lies on the ground so as to be oriented parallel to the harvesting direction or to the direction of travel of the mowing machine.

The rotary rake 20 also has a swath turner 29. FIGS. 3 to 8 show different views and details of the swath turner 29 of the rotary rake 20 according to the invention. Swath turners 29 can grasp the harvested material lying in the middle and move it to the side or rake it out of grass stubble in which the mown harvested material may have got caught. As a result, the harvested material subsequently combined to form a swath using the rake rotors 26 can be picked up better and less harvested material remains on the surface of the field.

In the case of the rotary rake 20 according to the invention, the swath turner 29 has, on each of the two sides of the longitudinal bar 22, a first rake wheel 30 with a first diameter and a second rake wheel 31 with a second diameter, wherein the second diameter of the second rake wheel 31 is larger than the first diameter of the first rake wheel 30.

Figure 4:
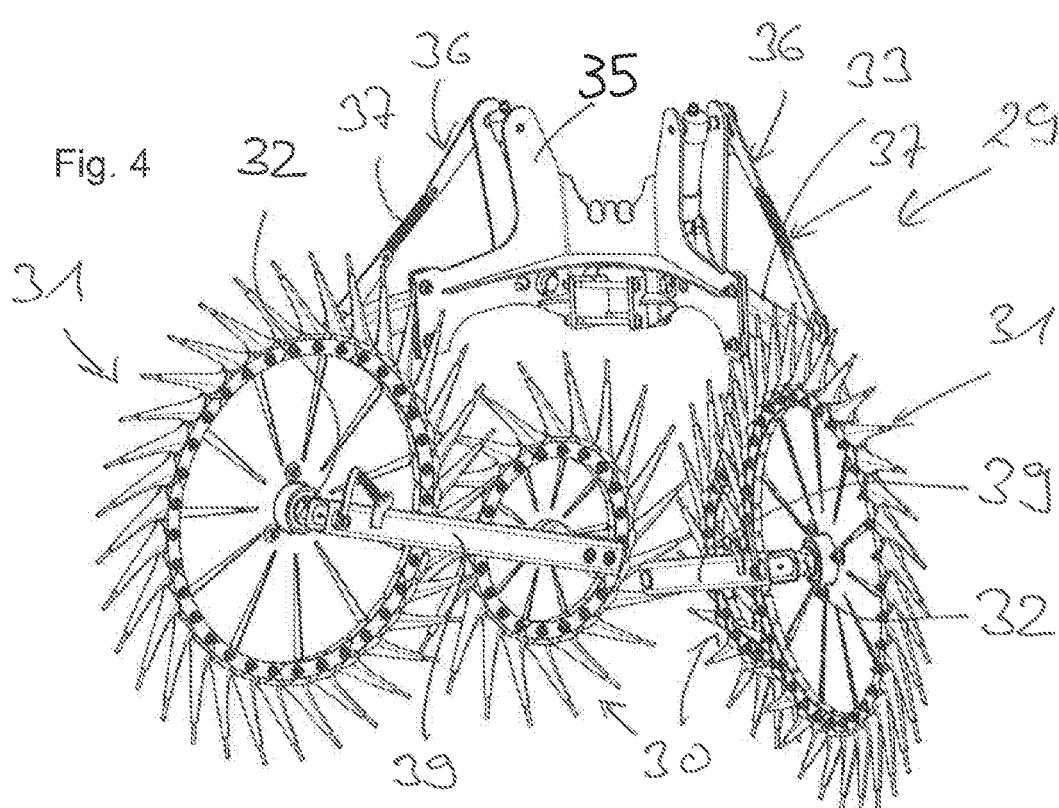
FIG. 4 shows the detail in FIG. 3 obliquely from the rear.
Figures 5, 6:
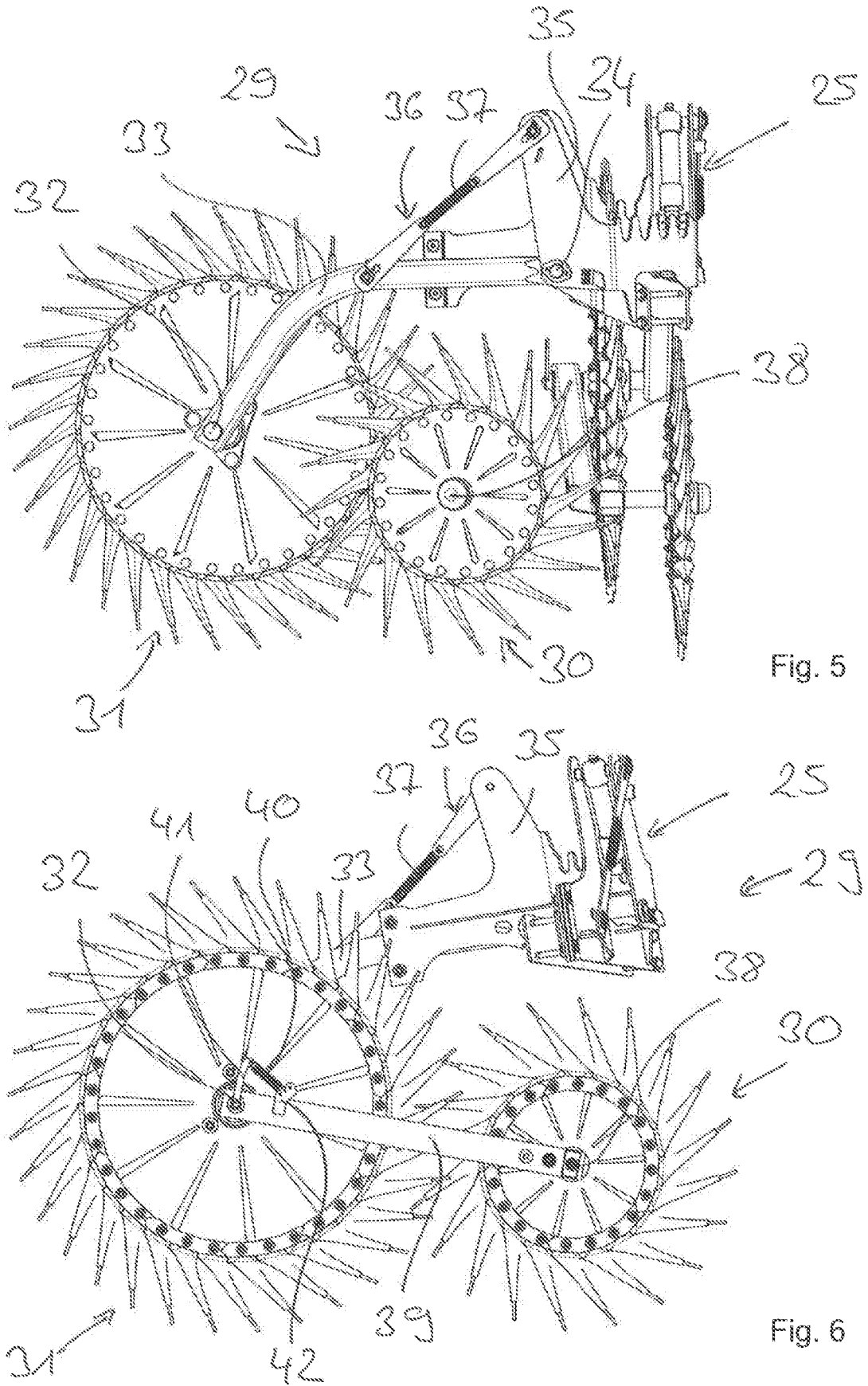
FIG. 5 shows the detail in FIG. 3 in a first side view.
FIG. 6 shows the detail in FIG. 3 in a second side view.
Figures 7, 8:
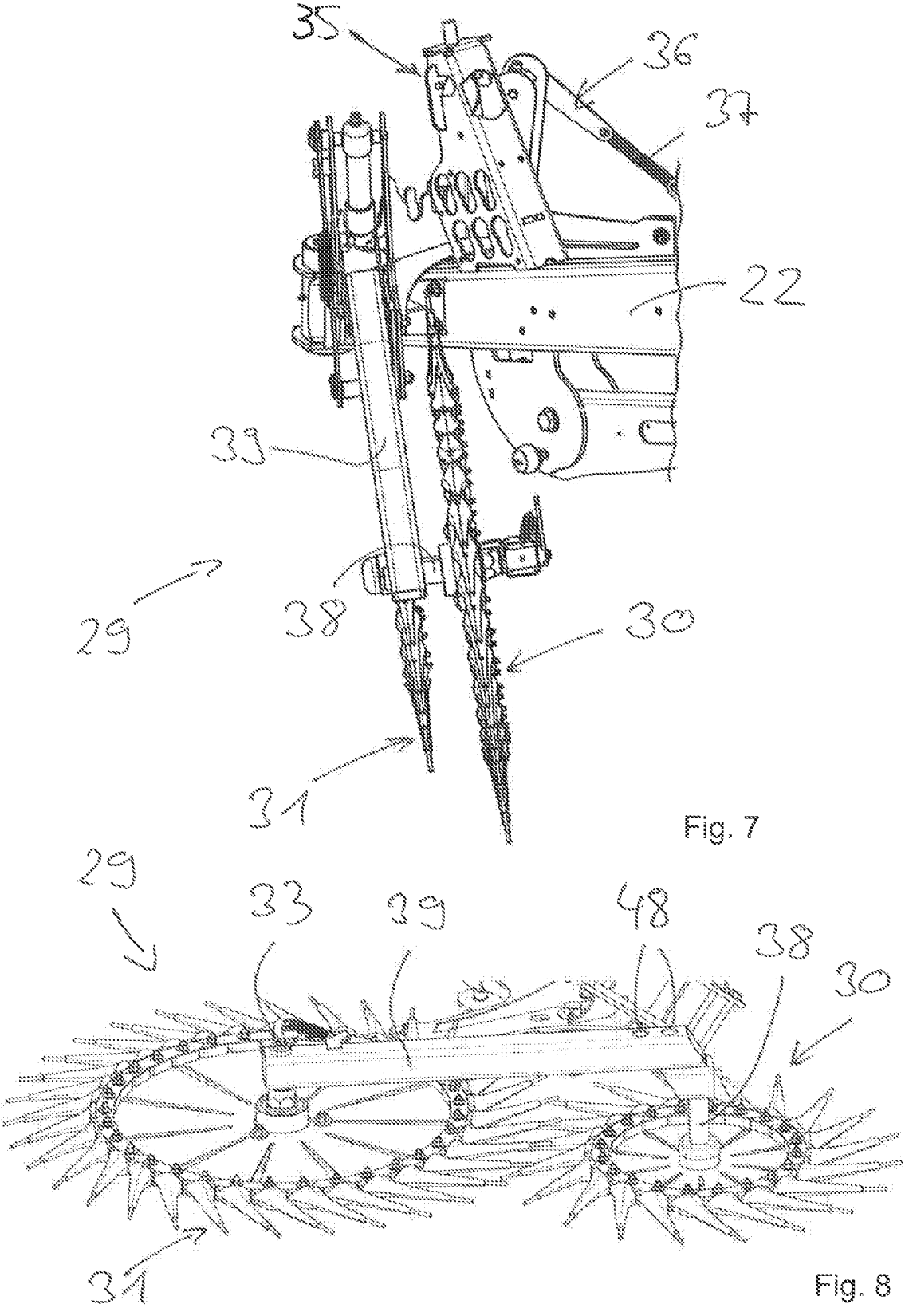
FIG. 7 shows a detail of FIG. 3.
FIG. 8 shows a further detail of FIG. 3.

As seen in the longitudinal direction of the longitudinal bar 22, which is not visible in FIGS. 4, 5 and 6, the respective second rake wheel 31 with the larger second diameter is arranged at least partially between the respective first rake wheel 30 and the extension arms 23 or the rake rotors 26.

Provision can be made that, as seen in the longitudinal direction of the longitudinal bar 22, the respective first rake wheel 30 with the smaller first diameter is arranged between the respective second rake wheel 31 and the drawbar 25.

In particular in so-called bottom-mounted rotary rakes 20—i.e. for example those mounted on the lower links of a three-point power lift of an agricultural towing vehicle—the longitudinal bar 22 is bent down towards the subjacent drawbar 25 and thus arranged lower down in this front region.

In the preferred exemplary embodiment shown, as seen in the longitudinal direction of the longitudinal bar 22, the respective first rake wheel 30 with the smaller first diameter is arranged beneath the subjacent part of the longitudinal bar 22. See in particular FIGS. 5 and 6 in this regard.

In the case of the rotary rake 20 according to the invention, the swath turner 29, while having a small space requirement, exhibits a good turning performance, this being because, on both sides of the longitudinal bar 22, the two rake wheels 30, 31 with the different diameters are arranged. Preferably, as in the preferred exemplary embodiment, the respective first rake wheel 30 is arranged beneath the longitudinal bar 22, resulting in a minimum space requirement.

A rotary axle 32 for the respective second rake wheel 31 is articulated to the longitudinal bar 22 via a preferably curved link 33. The respective link 33 is in this case pivotable about a pivot axle 34 relative to the longitudinal bar 22. In this case, the rotary axle 32 of the respective second rake wheel 31 is articulated to the drawbar 25 in a pulled and spring-balanced manner via the respective link 33, wherein, according to FIG. 5, a coupling link 36 having a spring element 37 extends between the link 33 and a portion 35 of the drawbar 25.

When the second rake wheels 31 roll on the underlying surface to be worked, the respective rotary axle 32 thereof is pulled forward in the direction of travel. Via the spring 37, ground following for the second rake wheels 31 can be ensured.

A rotary axle 38 of the respective first rake wheel 30 is articulated via a respective link 39 to the rotary axle 32 of the respective second rake wheel 31, which is arranged, together with the respective first rake wheel 30, on the same side of the longitudinal bar 22, with the result that when the rake wheels 30, 31 roll on the underlying surface to be worked, the rotary axles 38 of the first rake wheels 30 are pushed forward in the direction of travel.

The respective link 39, via which the rotary axle 38 of the respective first rake wheel 30 is attached to the rotary axle 32 of the respective second rake wheel 31, is pivotable about the rotary axle 32 of the respective second rake wheel 31, specifically in a spring-balanced manner via a spring element 40 which is attached to two levers 41, 42. A first lever 41 is attached for conjoint rotation to the rotary axle 32 of the respective second rake wheel 31, and a second lever 42 is fixedly connected to the respective link 39. As a result, spring-balanced, independent ground following for the respective first rake wheel 30 can be provided.

The rake wheels 30, 31 arranged on the same side of the longitudinal bar 22 are each oriented parallel to one another with a partial overlap.

Figure 3:
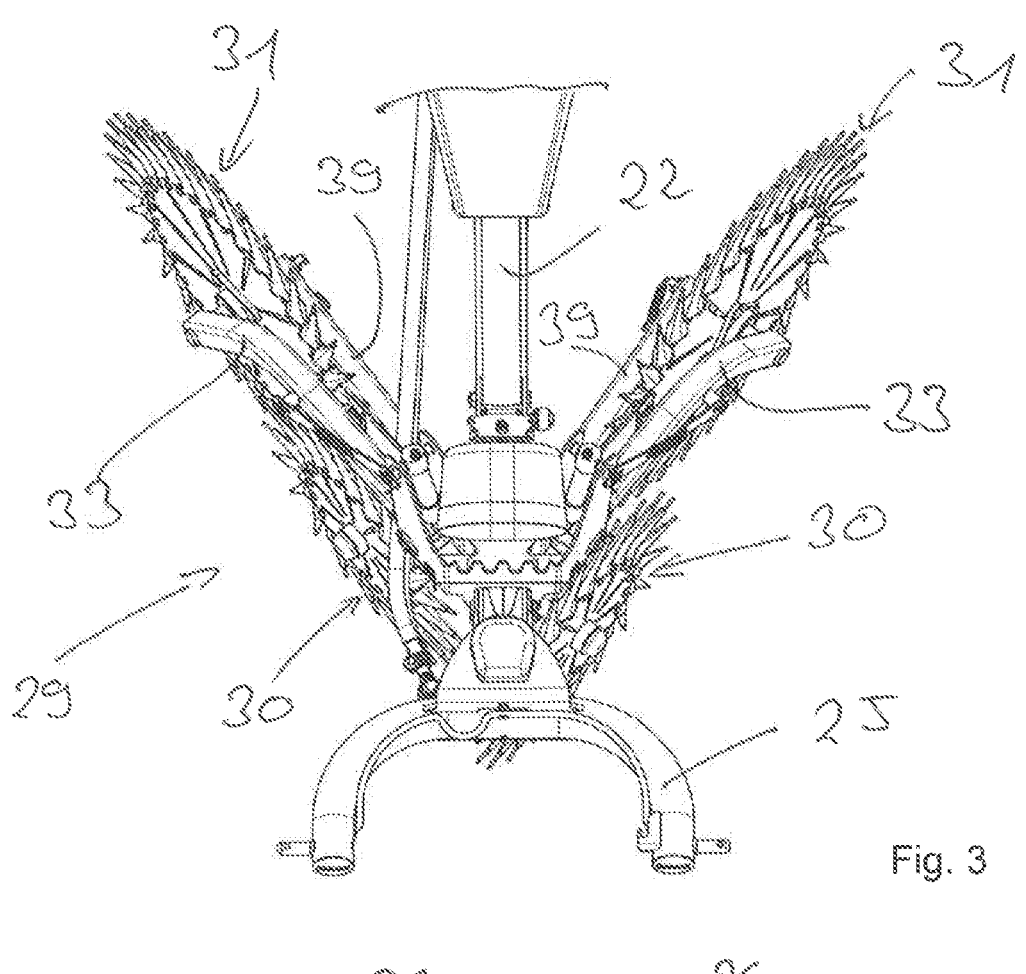
FIG. 3 shows a detail of FIG. 2.

The rake wheels 30, 31 arranged on different sides of the longitudinal bar 22 are oriented so as to diverge in a V-shaped manner in the direction of the extension arms 23 (see in particular FIGS. 1, 2 and 3).

Figures 9, 10, 11:
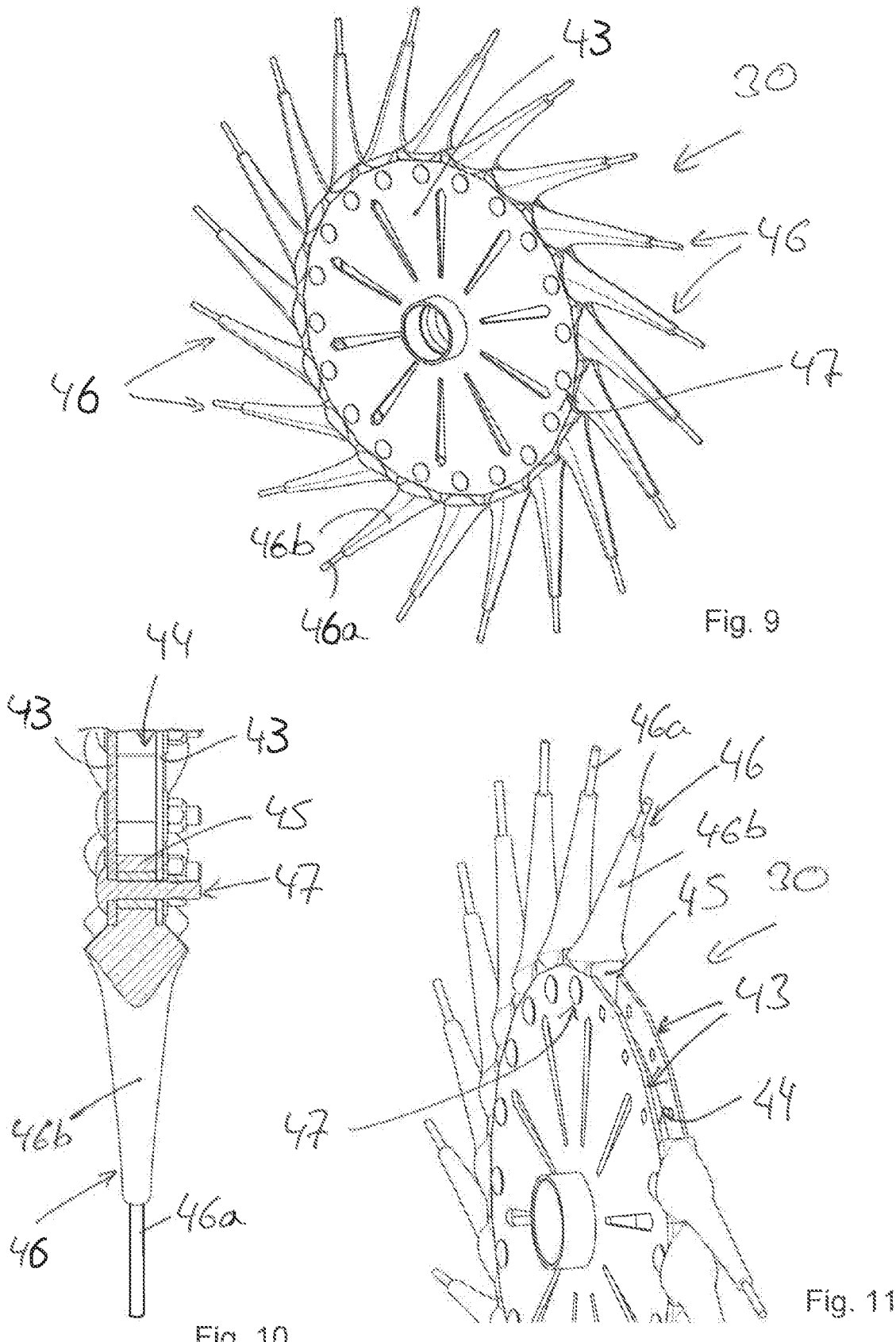
FIG. 9 shows a rake wheel in a perspective view.
FIG. 10 shows a detail of FIG. 9.
FIG. 11 shows a detail of FIG. 9.

FIGS. 9, 10 and 11 show details of a first rake wheel 30, wherein the second rake wheels 31 are constructed analogously. Thus, the rake wheel 30 according to FIGS. 9, 10 and 11 has two disks 43 positioned parallel to one another. The two disks 43 are arranged in a spaced-apart manner such that a gap 44 is formed between them.

Rake tines 46 of the rake wheel 30, which are connected individually to the disks 43 via screw connections 47, project into this gap 44 with a fastening portion 45. Each rake tine 46 has the respective tine 46a and a holder 46b for the respective tine 46a, wherein, according to FIG. 10, the respective tine 46a is embodied to be round in cross section. The screw connections 47 extend through the holders 46b.

According to a further exemplary embodiment, only one disk 43 is provided on a rake wheel 30, 31, said disk 43 being arranged on the side facing the harvested material. On the rear side, facing away from the harvested material, of the rake wheel 30, 31, a circular ring is mounted, which is preferably subdivided into a plurality of segments. This advantageously makes it easier to exchange individual rake tines 46.

In the preferred exemplary embodiment shown, the swath turner 29 accordingly has a total of four rake wheels 30, 31, specifically, on each of the two sides of the longitudinal bar 22, a first rake wheel 30 with a relatively small diameter and a second rake wheel 31 with a relatively large diameter. The first rake wheels 30 are articulated to the second rake wheels 31 by a pushed, spring-balanced articulation. The second rake wheels 31 are articulated to the longitudinal bar 22 or to the drawbar 25 by a pulled, spring-balanced articulation. In their working position, the first rake wheels 30 are positioned preferably beneath the subjacent longitudinal bar 22. The rake wheels 30, 31 arranged on different sides of the longitudinal beam 22 are inclined in a V-shape with respect to one another as seen in the longitudinal direction.

According to a further exemplary embodiment, the rake wheels 30, 31 can additionally also enclose an angle with the vertical—i.e. be inclined. In this exemplary embodiment, the rake wheels 30, 31 arranged on different sides of the longitudinal beam 22 are inclined in a V-shape with respect to one another both as seen in the longitudinal direction and as seen in the vertical direction.

The overlapping of the first rake wheels 30 with one another and with the second rake wheels 31 can be adapted. To this end, different attachment points 48 (see FIG. 8) are provided on the link 39, with the aid of which attachment points 48 the respective first rake wheel 30 can be mounted on the respective link 39 at a different distance from the rotary axle 33 of the respective second rake wheel 31.

Rather than being arranged on the rotary rake 20, illustrated by way of example, with two rake rotors 26, a swath turner 29 according to the invention can, of course, also be arranged on a hay rake with more rake rotors—for example on a rotary rake with 4 or 6 rake rotors 26.

The rotary rake 20 according to the invention can be embodied such that the rake rotors 26 and the rake wheels 30, 31 are each displaceable jointly and accordingly synchronously between a working position and a headland position and/or transport position. Alternatively, it is also possible to displace the rake rotors 26 and the rake wheels 30, 31 independently of one another and thus to displace them independently of one another from their respective working position into the headland position and/or into the transport position.

LIST OF REFERENCE SIGNS

20 Rotary rake
21 Base frame
22 Longitudinal bar
23 Extension arm
24 Supporting wheel
25 Drawbar
26 Rake rotor
27 Tine arm
28 Rake tines
29 Swath turner
30 Rake wheel
31 Rake wheel
32 Rotary axle
33 Link
34 Pivot axle
35 Portion
36 Coupling link
37 Spring element
38 Rotary axle
39 Link
40 Spring element
41 Lever
42 Lever
43 Disks
44 Gap
45 Fastening portion
46 Rake tines
46a Tines
46b Holder
47 Screw connection
48 Attachment point

The invention claimed is:

1. A rotary rake (20)
having a base frame (21) comprising a longitudinal bar (22) and extension arms (23) arranged on both sides of the longitudinal bar (22), wherein the rotary rake is able to be coupled to a towing vehicle via a drawbar (25) that is attached to the longitudinal bar (22),
having rake rotors (26) that are driven in rotation about a respective rotor axis, have tine arms (27) with rake tines (28), and are mounted on the extension arms (23),
having a swath turner (29) that is attached to the longitudinal bar (22) between the drawbar (25) and the extension arms (23) and has rake wheels (30, 31), characterized in that
the swath turner (29) has, on each of the two sides of the longitudinal bar (22), a first rake wheel (30) with a first diameter and a second rake wheel (31) with a second diameter that is larger than the first diameter and,
wherein a rotary axle (32) for the respective second rake wheel (31) is attached to the longitudinal bar (22) via a link (33) and is articulated in a pulled and spring-balanced manner via the respective link (33), and wherein a rotary axle (38) for the respective first rake wheel (30) is attached to the rotary axle (32) for the respective second rake wheel (31) via a further link (39) and the rotary axle (38) for the respective first rake wheel (30) is articulated in a pushed and spring-balanced manner via the respective link (39).

2. The rotary rake according to claim 1, characterized in that, as seen in the longitudinal direction of the longitudinal bar (22), the second rake wheels (31) are arranged at least partially between the first rake wheels (30) and the extension arms (23).

3. The rotary rake according to claim 1, characterized in that, as seen in the longitudinal direction of the longitudinal bar (22), the first rake wheels (30) are arranged at least partially between the second rake wheels (31) and the drawbar (25).

4. The rotary rake according to claim 1, characterized in that, as seen in the longitudinal direction of the longitudinal bar (22), the first rake wheels (30) are arranged beneath the longitudinal bar (22).

5. The rotary rake according to claim 1, characterized in that rake wheels (30, 31) arranged on the same side of the longitudinal bar (22) are oriented parallel to one another with a partial overlap.

6. The rotary rake according to claim 1, characterized in that rake wheels (30, 31) arranged on different sides of the longitudinal bar (22) are oriented so as to diverge in the direction of the extension arms (23) and to converge towards the underlying surface.

7. A rotary rake (20) comprising:
a base frame (21) comprising a longitudinal bar (22) and extension arms (23) arranged on both sides of the longitudinal bar (22), wherein the rotary rake is able to be coupled to a towing vehicle via a drawbar (25) that is attached to the longitudinal bar (22);
rake rotors (26) that are driven in rotation about a respective rotor axis, have tine arms (27) with rake tines (28), and are mounted on the extension arms (23);
a swath turner (29) that is attached to the longitudinal bar (22) between the drawbar (25) and the extension arms (23) and has rake wheels (30, 31), wherein the swath turner (29) has on each of the two sides of the longitudinal bar (22), a first rake wheel (30) and a second rake wheel (31);
wherein a rotary axle (32) for the respective second rake wheel (31) is attached to the longitudinal bar (22) via a link (33) and is articulated in a pulled and spring-balanced manner via the respective link (33), and wherein a rotary axle (38) for the respective first rake wheel (30) is attached to the rotary axle (32) for the respective second rake wheel (31) via a further link (39) and the rotary axle (38) for the respective first rake wheel (30) is articulated in a pushed and spring-balanced manner via the respective link (39).

\* \* \* \* \*